United States Patent [19]

Dvorak et al.

[11] Patent Number: 5,765,814
[45] Date of Patent: Jun. 16, 1998

[54] FLOW RATE STABILIZER FOR THROTTLING VALVES

[75] Inventors: Allen D. Dvorak; Paul J. Schafbuch, both of Marshalltown; David J. Westwater, Albion, all of Iowa

[73] Assignee: Fisher Controls International, Inc., Clayton, Mo.

[21] Appl. No.: 558,174

[22] Filed: Nov. 15, 1995

[51] Int. Cl.$^6$ ............................................. F16K 47/08
[52] U.S. Cl. ........................... 251/127; 251/118; 251/359
[58] Field of Search .................................. 251/117, 118, 251/123, 127, 359; 138/44, 45, 42

[56] References Cited

U.S. PATENT DOCUMENTS

| | | | |
|---|---|---|---|
| 2,524,009 | 9/1950 | Dopp et al. | 251/118 X |
| 3,776,278 | 12/1973 | Allen. | |
| 4,326,554 | 4/1982 | Gongwer. | |
| 4,506,860 | 3/1985 | von Schwerdtner et al. | 251/118 X |
| 4,960,260 | 10/1990 | McEnearney | 251/127 |
| 4,986,512 | 1/1991 | Tiefenthaler | 251/118 |
| 5,209,259 | 5/1993 | Dear et al. | |

FOREIGN PATENT DOCUMENTS

| | | |
|---|---|---|
| 684 060 | 12/1966 | Belgium. |
| 0 216 992 | 4/1987 | European Pat. Off. |
| 2 238 884 | 2/1975 | France. |
| 21 10 149 | 9/1972 | Germany. |
| 31 38 459 | 6/1982 | Germany. |
| 37 17 128 | 12/1988 | Germany. |
| 59-140967 | 8/1984 | Japan. |
| 59-140973 | 8/1984 | Japan. |
| 0107469 | 7/1992 | Japan ............................ 251/118 |
| 2 019 532 | 10/1979 | United Kingdom. |
| 2 133 902 | 9/1984 | United Kingdom. |

OTHER PUBLICATIONS

Fisher Controls Brochure, "Design EZ Sliding–Stem Control Valves," *Fisher Controls*, Bulletin 51.1:EZ, pp. 1–18 (Apr. 1994).

Fisher Controls Brochure, "For Economical and Accurate Control, Type 399A Makes It Easy," Form 8366, 16, pp., 1995.

Fisher Controls, Type 399 Easy Joe Valve spec. sheet, 1 pg.

Leslie Controls Brochure, "Aeroflow," 4 pp.

Two Fisher Controls Drawings Illustrating the Fisher Controls 4"-1500 HP Valve.

*Primary Examiner*—Kevin Lee
*Attorney, Agent, or Firm*—Marshall, O'Toole, Gerstein, Murray & Borun

[57] ABSTRACT

A valve includes a fluid inlet passageway coupled to a fluid outlet passageway through an orifice and a valve plug which is moveable with respect to the orifice to vary the rate of fluid flow through the orifice. A seat ring is disposed at the orifice and includes a structural member extending into the fluid inlet passageway adjacent the orifice which prevents disturbances, such as intermittent vortices, from forming within the fluid in the fluid inlet passageway and which, thereby, provides a stable rate of fluid flow through the valve. The structural member may, alternatively, be connected to the valve plug or a wall of the fluid inlet passageway.

44 Claims, 7 Drawing Sheets

FLOW RATE STABILIZER FOR THROTTLING VALVES

This invention relates generally to valves and more particularly to throttling valves having flow rate stabilizers therein.

BACKGROUND OF THE INVENTION

Throttling valves are used in a wide number of process control system applications to control some parameter of a process fluid. While the process control system uses a throttling valve to control the pressure, level, pH or other desired parameter of a fluid, the throttling valve ultimately controls the rate of fluid flow.

Typically, a throttling valve includes a fluid inlet passageway coupled through an orifice to a fluid outlet passageway and a closure member disposed in the orifice which controls the amount of fluid flow therethrough. The closure member may include a valve plug having a surface which seats against a seat ring disposed at the orifice. During operation, the control system moves the valve plug towards and away from a surface of the seat ring to provide a desired fluid flow through the orifice and, therefore, the throttling valve.

The flow rate of a throttling valve is generally considered, by definition, to be a steady-state value for a given valve plug position and given pressure conditions. As a result, system designers have traditionally treated the flow rate of a throttling valve as a constant when designing a control system. In reality, however, the flow rate of a throttling valve does not remain perfectly constant but fluctuates during use. Changes in the flow rate of a valve may manifest themselves as momentary jumps in the valve flow rate or as persistent changes in the valve flow rate resulting in, for example, bi-stable flow rates. Although it has been surmised that the change in valve flow rate is related to turbulence, the precise cause of changes in the flow rate of valves has been, heretofore, unknown.

It is, however, generally known that turbulence is produced in a valve under most conditions. Turbulence is an irregular condition of fluid flow in which the pressure, the velocity, etc. of a fluid vary chaotically. Turbulence exists over a range of physical dimensions and time scales, i.e., from physically large fluid motions to physically small fluid motions and from rapid random changes to slow random changes.

Furthermore, during operation of a valve, the fluid in the valve must speed up to pass through the flow restriction created by the valve plug and the orifice. It has been conjectured that turbulence and/or the higher speed flow of a fluid in a valve may lead to flow patterns within the valve that are not stable. These unstable flow patterns may cause flow rate disturbances.

Flow rate disturbances, which may occur to a greater or lesser amount at different fluid pressures and flow rates, appear within a throttling valve over a wide range of frequencies and operate to effect the fluid flow through the valve. Some of the flow disturbances within a throttling valve occur at frequencies which are much greater than the characteristic frequency of the process being controlled or much greater than the frequency range over which typical control process equipment can respond. These high frequency flow disturbances manifest themselves as noise and are effectively filtered out by the mechanical flow capacitance inherent in the process. As a result, these high frequency disturbances do not significantly effect the operation of the control system.

Furthermore, some disturbances within a throttling valve occur at frequencies which are much lower than the characteristic frequencies of the process and the process control equipment. The process control system can compensate for these low frequency disturbances during closed-loop operation because the control system is able to recognize the slowly changing values of fluid flow caused by these low frequency disturbances and adjust the throttling valve accordingly.

However, disturbances which appear at frequencies on the order of the characteristic frequencies associated with the process and the process control equipment, that is, intermediate frequency disturbances, cause significant problems in the process control system because the process controller is changing process control parameters to compensate for these disturbances at about the same rate that the disturbances are appearing and disappearing. The process controller, therefore, has a hard time keeping up with these intermediate frequency disturbances which, in turn, leads to poor controller performance.

Up until the present, no one really understood what was causing intermediate frequency disturbances and, therefore, how to best negate these disturbances in a process. Furthermore, there has been no widely applicable solution for reducing the intermediate frequency disturbance in a valve, such as a throttling valve.

SUMMARY OF THE INVENTION

It has been discovered that disturbances in the flow rate of a valve result from the formation of fluid flow disturbances such as quasi-steady-state vortices in the upstream or fluid inlet passageway of a valve and that the formation and break-up of these vortices corresponds to the apparent change in valve flow rate. It has also been determined that, to provide a valve with as stable a flow rate as possible, it is important to prevent disturbances, such as the intermittent formation and break-up of vortices, within the upstream or fluid inlet passageway of a valve.

The present invention relates to valve designs and, in particular, to seat ring designs, valve plug designs and fluid passageway designs for use in a valve, such as a throttling valve, which eliminate intermediate frequency fluid flow disturbances caused by turbulence or other physical phenomena by preventing the intermittent formation of vortices within the fluid present in the upstream or fluid inlet passageway of the valve.

According to one aspect of the invention, a valve includes a fluid inlet passageway coupled through a fluid outlet passageway to a fluid outlet. An orifice is disposed between the fluid inlet passageway and the fluid outlet and a valve plug is movably disposed with respect to the orifice to vary the flow rate of the fluid through the valve. A member is disposed in the fluid inlet passageway which reduces the intermittent disturbances of the fluid in the fluid inlet passageway.

The disturbance reduction member may comprise a vane disposed in the fluid inlet passageway, extending from, for example, a seat ring disposed in the orifice. This vane may be disposed in a parallel, perpendicular or diagonal manner with respect to the flow of fluid through the fluid inlet passageway. The disturbance reduction member may include multiple vanes which are configured in, for example, a cross shape. Alternatively, the disturbance reduction member may be basket-shaped or may comprise one or more cylindrical or tubular shaped bodies extending from the seat ring. If desired, such cylindrical or tubular shaped bodies may include holes in the walls thereof. Furthermore, the disturbance reduction member may be coupled to the valve plug or a wall of the fluid inlet passageway instead of the seat ring.

According to another aspect of the present invention, a cavity may be formed in the fluid inlet passageway which creates a constant or steady-state vortex within the fluid in the fluid inlet passageway. This steady-state vortex prevents intermittent vortices or other flow rate disturbances from occurring. Specifically, the cavity may be disposed asymmetrically with respect to the fluid inlet or to the orifice between the fluid inlet passageway and the fluid outlet passageway such that fluid entering a portion of the fluid inlet passageway directly adjacent the orifice is caused to form into a vortex.

BRIEF DESCRIPTION OF THE DRAWINGS

The advantages of the present invention will be apparent upon reading the following description in conjunction with the drawings, in which.

DETAILED DESCRIPTION

Figure 1:
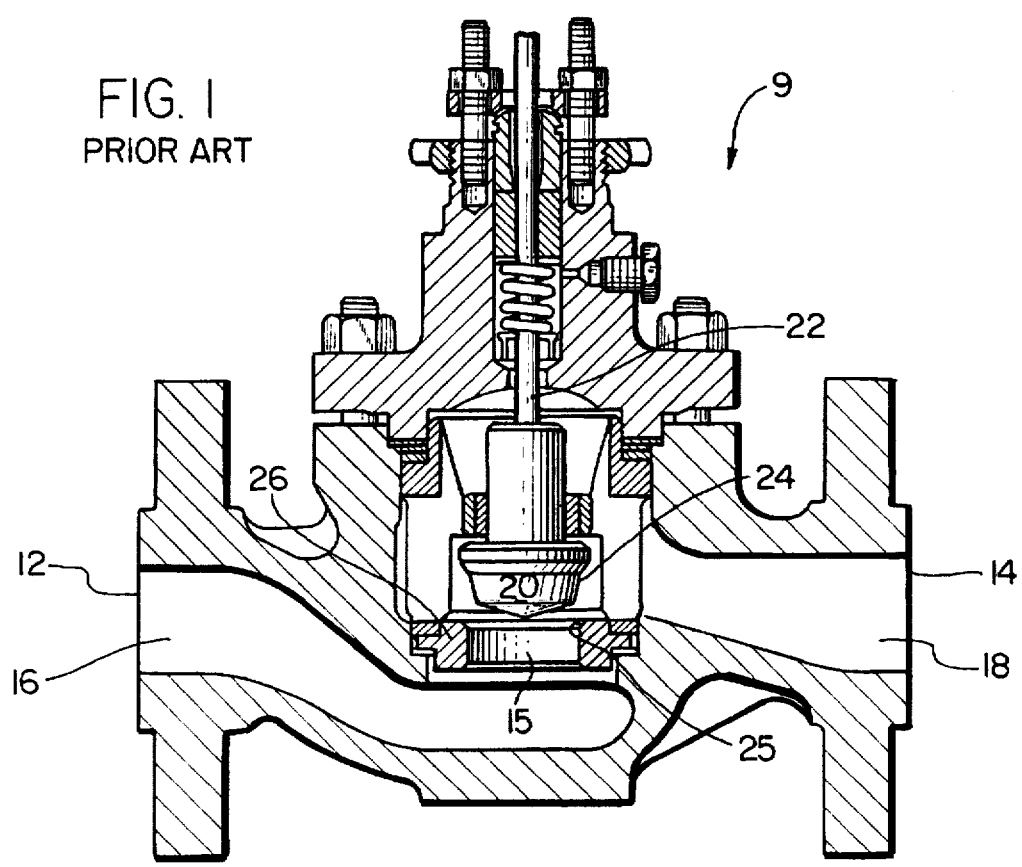
FIG. 1 is a cross-sectional view of a known throttling valve.

Referring now to FIG. 1, a prior art throttling valve 9 includes a fluid inlet 12, a fluid outlet 14 and a fluid inlet passageway 16 which couples the fluid inlet 12 through an orifice 15 to a fluid outlet passageway 18. A valve plug 20 is coupled through a valve stem 22 to an actuator (not shown), and has an outer surface 24 which comes into contact with a valve seat such as a surface 25 of a seat ring 26 disposed in the orifice 15. The seat ring 26 comprises an annular ring member having an aperture therethrough which accepts the valve plug 20. However, no part of the seat ring 26 is disposed in the fluid inlet chamber 16.

During operation of the throttling valve 9, the actuator (not shown) moves the valve stem 22 and the valve plug 20 towards and away from the seat ring 26 to close and open, respectively, the throttling valve 9. The position of the valve plug surface 24 with respect to the surface 25 of the seat ring 26 determines the rate at which fluid flows between the valve plug 20 and the seat ring 26 and, therefore, the rate at which fluid flows through the throttling valve 9.

Figure 2:
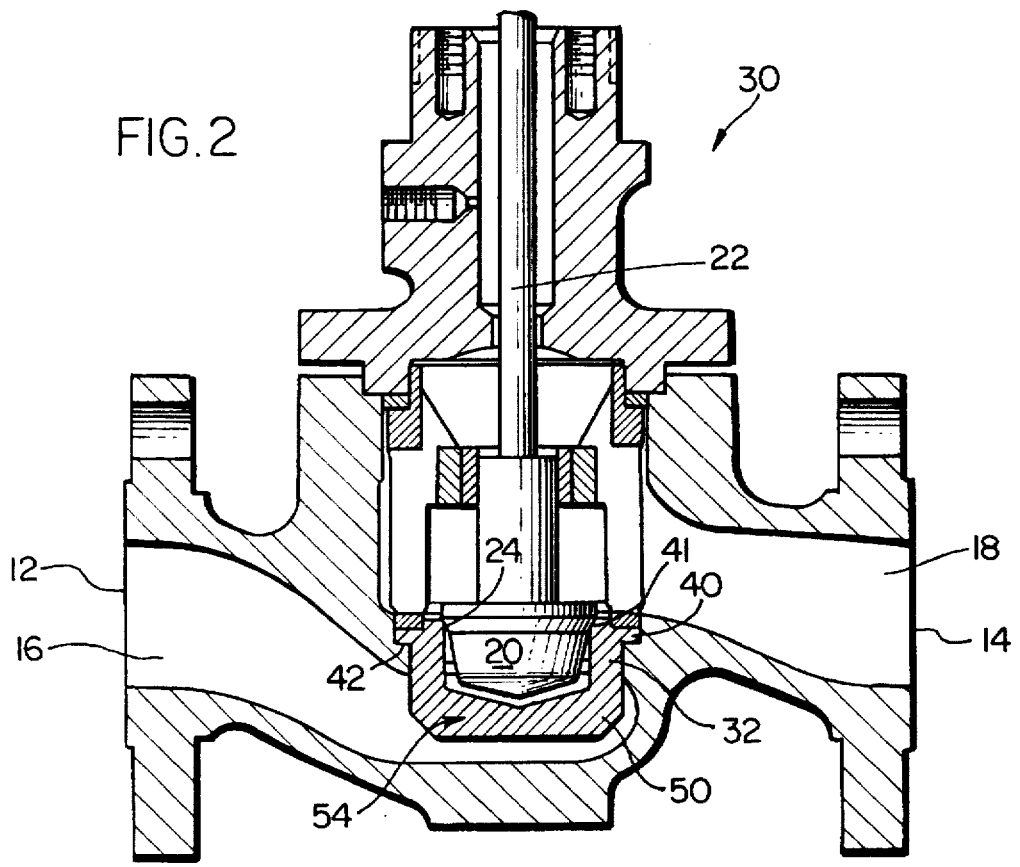
FIG. 2 is a cross-sectional view of a first embodiment of a throttling valve having a seat ring according to the present invention.
Figure 3:
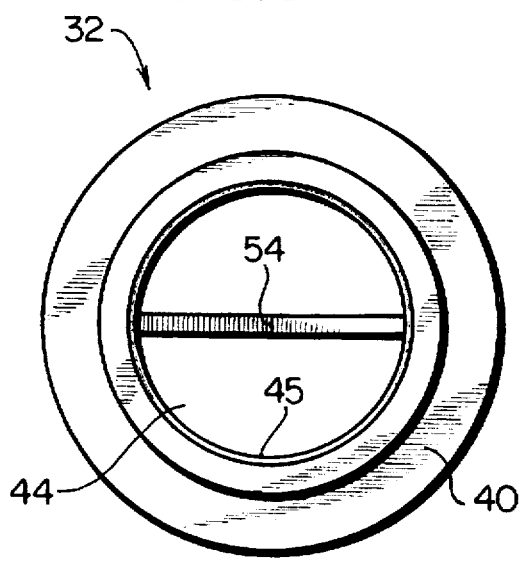
FIG. 3 is a top elevational view of the seat ring of FIG. 2.
Figure 4:
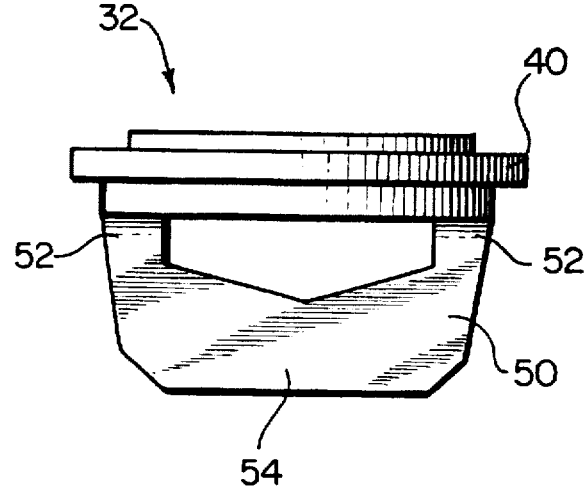
FIG. 4 is a side elevational view of the seat ring of FIG. 2.
Figure 5:
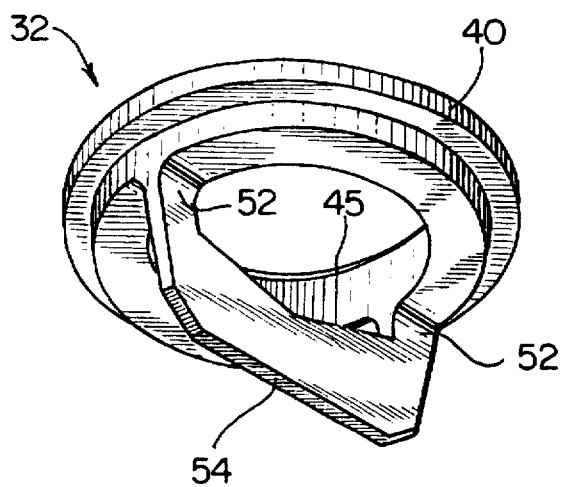
FIG. 5 is a perspective view of the seat ring of FIGS. 2–4.
Figure 6:
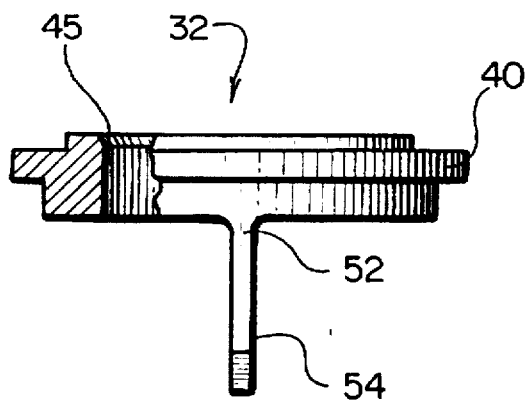
FIG. 6 is a partially cut away, side elevational view of the seat ring of FIGS. 2–5.

Referring now to FIG. 2, a throttling valve 30 constructed according to the present invention is illustrated. The throttling valve 30, which is specifically adapted for use in liquid applications but may also be used in gas applications, is similar to the throttling valve 9 of FIG. 1 and has like components numbered identically thereto. However, a seat ring 32 of the throttling valve 30 includes a member disposed in the fluid inlet passageway 16 which prevents disturbances, such as quasi-steady-state vortices, from forming in the fluid inlet passageway 16.

With reference to FIGS. 2–6, the seat ring 32 includes a ring member 40 disposed against a ledge 42 formed in the valve 30. The ring member 40 includes an aperture or hole 44 adapted to receive the valve plug 20 and a surface 45 which comes into contact with the valve plug surface 24 when the valve plug 20 is driven to the closed position. The seat ring 32 also includes a vane 50 having two leg portions 52 connected to the ring member 40 and a connecting member 54 disposed between the two leg members 52 directly adjacent or beneath the aperture 44 of the ring member 40.

As illustrated in FIG. 2, the connecting member 54 is disposed within the fluid inlet passageway 16 directly adjacent a lower surface of the valve plug 20 when the seat ring 32 is disposed in the throttling valve 30. The vane 50 of the seat ring 32, when disposed in the fluid inlet passageway 16, prevents or breaks up vortices which may occur within the fluid inlet passageway 16 while fluid is flowing between the fluid inlet passageway 16 and the fluid outlet passageway 18. In particular, as soon as a vortex starts to form within the fluid inlet passageway 16, that is, circulation of fluid within the fluid inlet passageway 16 with fluid velocity in a direction other than the direction normal to the orifice 15, the vane 50 blocks the circular or swirling flow components of that vortex and, thereby, dissipates the vortex. This function, in turn, prevents flow disturbances, such as intermittent vortices, from occurring within the throttling valve 30.

Figure 7:
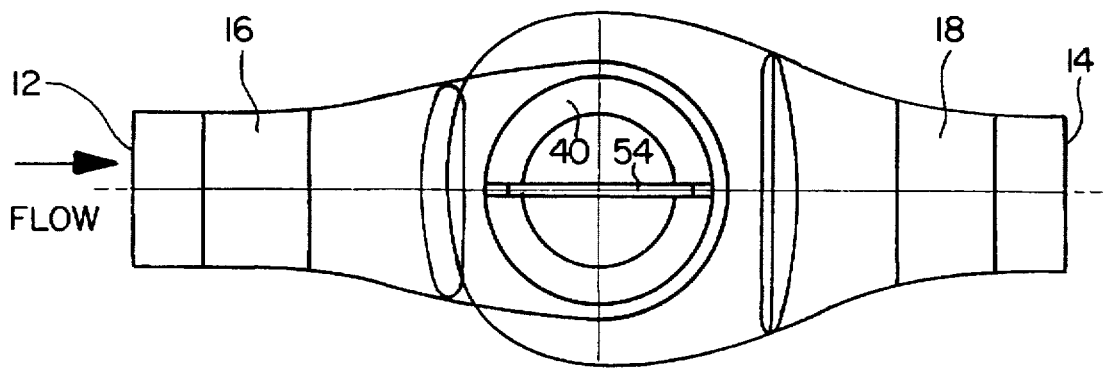
FIG. 7 is a bottom wire-frame diagram view of the throttling valve of FIG. 2.
Figure 8:
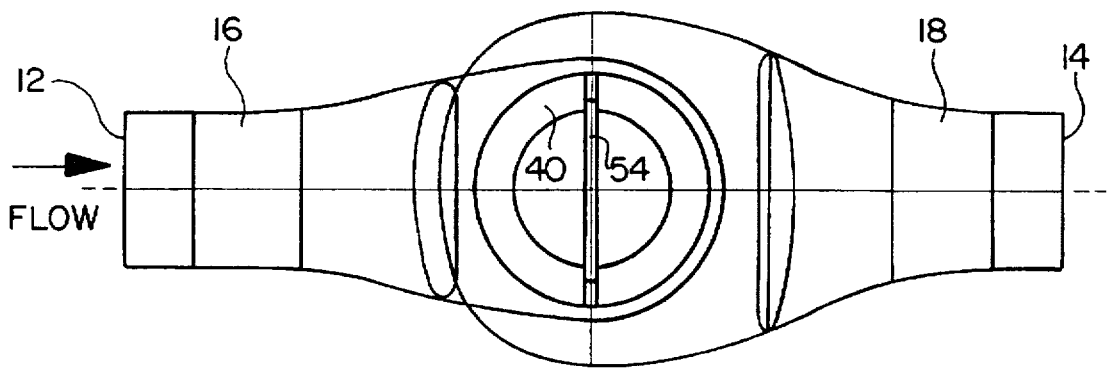
FIG. 8 is a bottom wire-frame diagram view of a throttling valve having the seat ring of FIGS. 3–6 disposed perpendicularly to the fluid flow direction.
Figure 9:
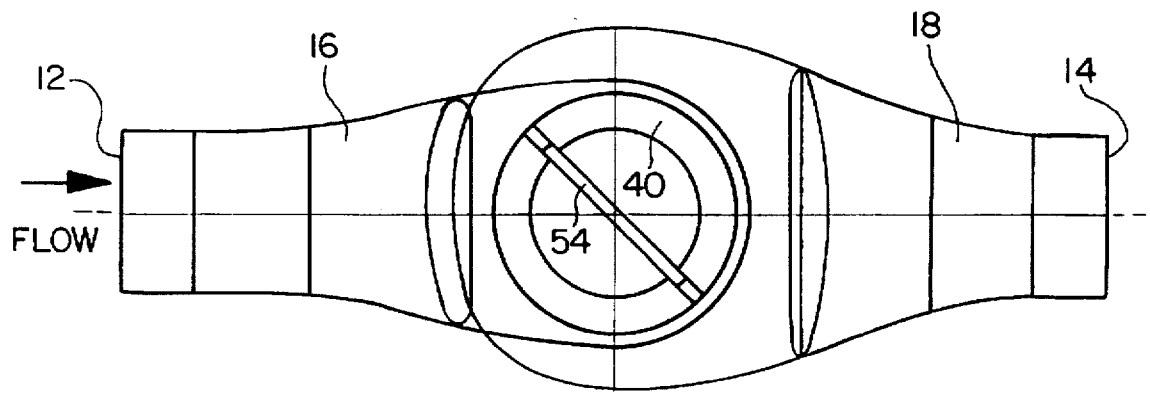
FIG. 9 is a bottom wire-frame diagram view of a throttling valve having the seat ring of FIGS. 3–6 disposed diagonally to the fluid flow direction.

The vane 50 of the seat ring 32 is illustrated in FIG. 2 and FIG. 7 as being disposed parallel to the direction of the flow of the fluid in the fluid inlet passageway 16. However, the vane 50 may also be disposed perpendicular to the direction of fluid flow through the fluid inlet passageway 16, as illustrated in FIG. 8, or may be disposed at any diagonal angle with respect to the direction of fluid flow through the fluid inlet passageway 16. FIG. 9, for example, illustrates the connecting member 54 of the vane 50 oriented at a 45° diagonal angle with respect to the fluid flow direction of the fluid inlet passageway 16. It is preferable, however, to orient the vane 50 parallel to the direction of fluid flow through the fluid inlet passageway 16 to present the least flow resistance to the fluid in the throttling valve 30.

Although the vane 50 has been illustrated as having a single straight member disposed across the center of the aperture 44 of the ring member 40 and as having a generally V-shaped upper surface, the vane 50 can be any other desired shape, for example, curved, can include multiple vanes extending from the ring member 40 disposed in a parallel or any non-parallel manner and can have one or more vanes which cross the aperture 44 of the ring member 40 at any desired location, that is, be t wee n any two circumferential points of the ring member 40.

Figure 10:
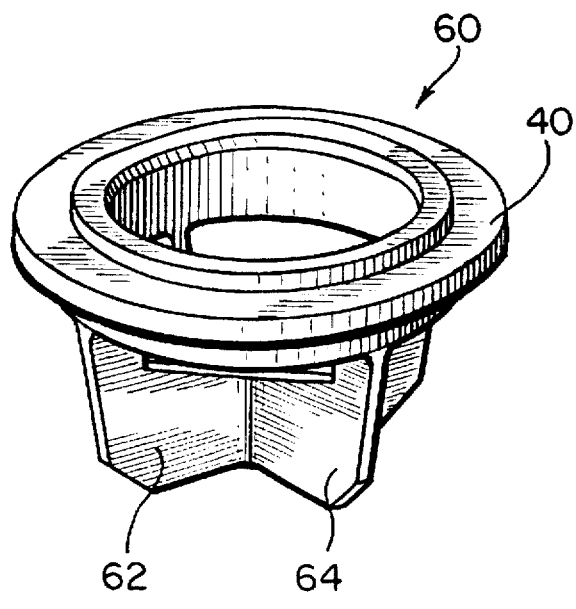
FIG. 10 is a perspective view of a second embodiment of a seat ring according to the present invention.
Figure 11:
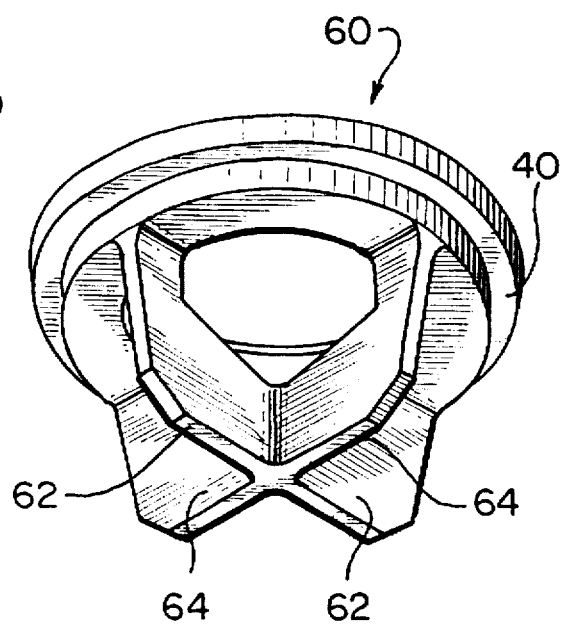
FIG. 11 is a further perspective view of the seat ring of FIG. 10.

Referring to FIGS. 10 and 11, a further embodiment of a seat ring 60 for use in the throttling valve 30 is illustrated. The seat ring 60 has two perpendicularly disposed vanes 62 and 64 connected to the ring member 40. The vanes 62 and 64 may be separate members and/or may be integrally connected as illustrated in FIGS. 10 and 11. While the vanes 62 and 64 are illustrated in FIGS. 10 and 11 as intersecting each other at 90° angles to form a cross-shaped member, these vanes could, instead, cross at any other desired angle or could be disposed parallel to one another.

Figure 12:
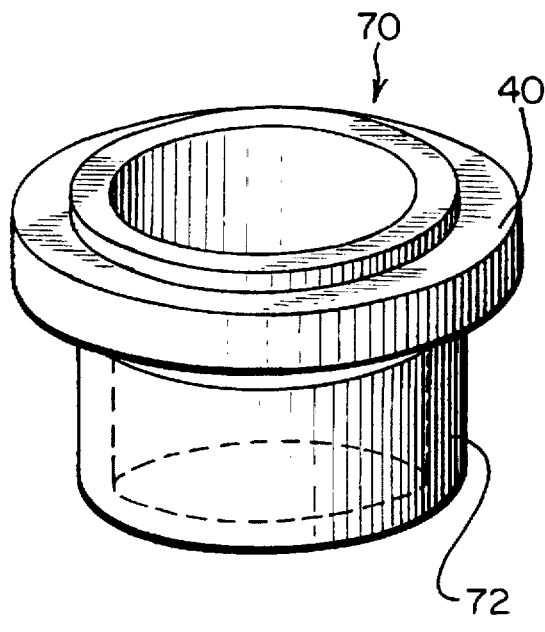
FIG. 12 is a perspective view of a third embodiment of a seat ring according to the present invention.

Referring to FIG. 12, another embodiment of a seat ring 70 for use in the throttling valve 30 is illustrated. The seat ring 70 includes a cylindrical body 72 connected to the ring member 40. The walls of the cylindrical body 72 can extend any desired length away from the ring member 40. However, the length of these walls must be carefully designed to provide sufficient clearance between the cylindrical body 72 and the nearest surface of the fluid inlet passageway 16 so as to allow a desired maximum flow rate through the throttling valve 30. That is, the cylindrical body 72 must extend down below the seat ring 70 a sufficient amount to prevent vortices from occurring within the fluid inlet passageway 16, but should not extend so close to a surface of the fluid inlet passageway 16 that the seat ring 70 diminishes the fluid flow capacity of the throttling valve 30.

Figure 13:
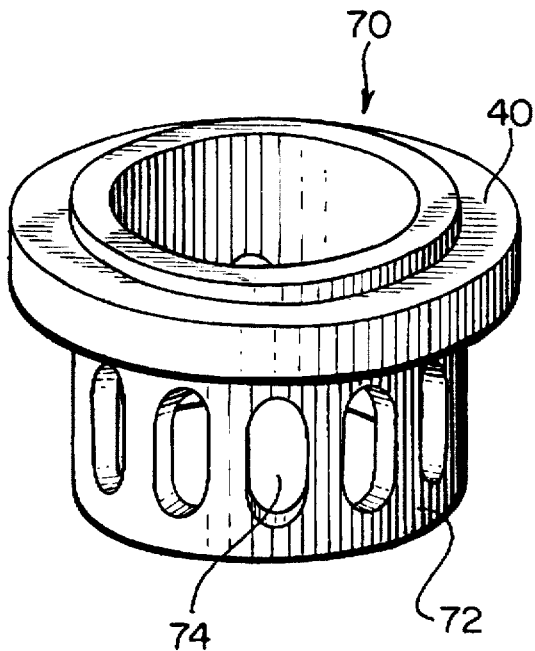
FIG. 13 is a perspective view of a fourth embodiment of a seat ring according to the present invention.

Referring to FIG. 13, an adaptation of the cylindrical body of FIG. 12 is illustrated as having oblong shaped holes 74 in the walls thereof. The holes 74, which can be of any desired shape and spaced at any desired spaced-apart locations in the walls of the cylindrical body 72, help to assure proper fluid flow capacity through the cylindrical body 72 while still allowing the cylindrical body 72 to break up or prevent vortices from occurring in the fluid inlet passageway 16. The embodiments of FIGS. 12 and 13, which include cylindrical bodies disposed concentrically with a ring member, have the advantage that they do not need to be oriented with respect to a particular direction when inserted into the throttling valve 30.

Although the cylindrical body 72 is illustrated in FIGS. 12 and 13 as being a tubular body having a circular cross-section and as being axially aligned with the ring member 40, the cylindrical body 72 could have any other shape, for example, any angular shape such as square, hexagonal, etc., and also could be configured other than coaxially with the ring member 40. The cylinderical body could also comprise multiple vanes extending straight down below the ring member 40 at one or multiple locations around the circumference of the ring member 40.

Figure 14:
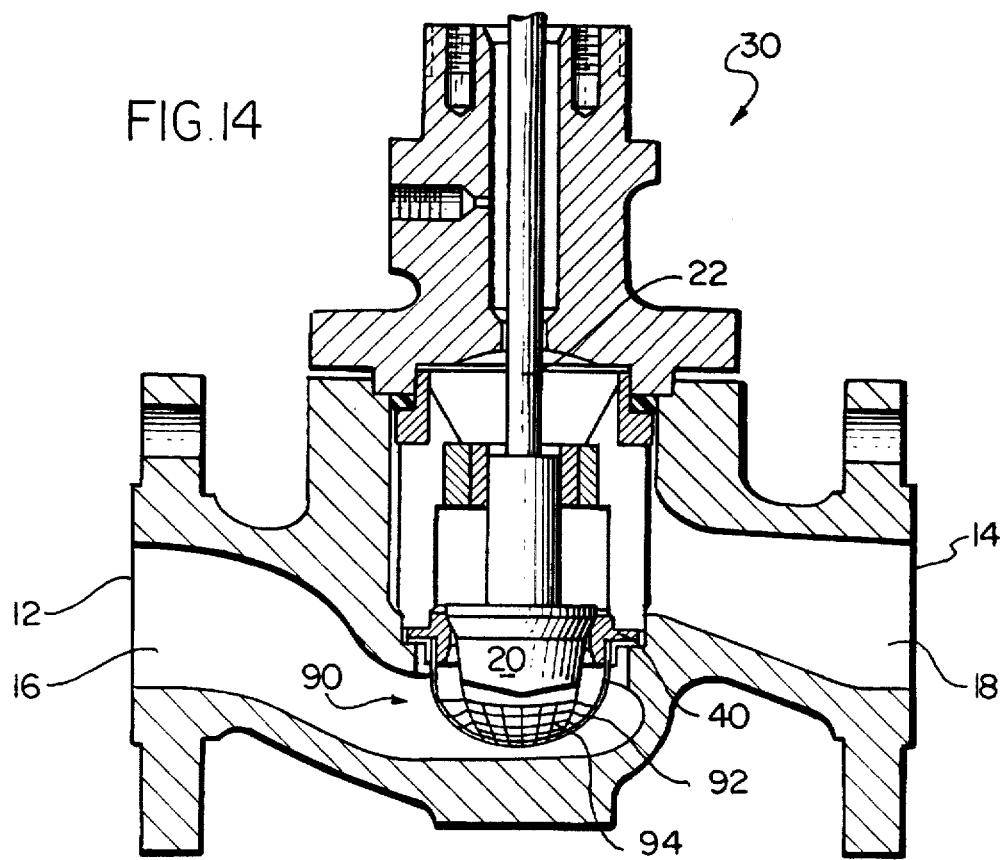
FIG. 14 is a cross-sectional view of a throttling valve having a fifth embodiment of a seat ring according to the present invention disposed therein.

A further embodiment of a seat ring 90 disposed in the throttling valve 30 is illustrated in FIG. 14. The seat ring 90 includes a basket 92 connected to the ring member 40 and disposed in the fluid inlet passageway 16. The basket 92 includes multiple wires coupled to the ring member 40 and a coarse mesh screen 94 connected to the wires. The wire and/or the coarse mesh screen 94 may be made of any desired material such as metal or plastic.

Importantly, the screen 94 should be made such that it does not operate to filter particles or other matter from the fluid flowing therethrough. That is, the mesh screen 94 should comprise a coarse screen having holes therein which are large enough to allow particles and other matter in the liquid or gas flowing through the valve 30 to pass therethrough. These holes comprise coarse passages. If the basket 94 operated as a filter, especially in a liquid application, particles would accumulate on the screen, block the flow path of the liquid and, eventually, cause the basket to fail due to the excessive force of the flowing liquid against the particles on the screen 94. As is evident, care must be taken to make the seat ring 90 structurally sound, especially when the seat ring 90 is used in a valve where high fluid flow forces are present.

While the above-described throttling valve and seat ring embodiments have been illustrated and described as including structural components, such as vanes, baskets or cylindrical bodies, which are connected to a seat ring for the purpose of stabilizing fluid flow, these structural components could, instead or in addition, be connected to any other member of the throttling valve, such as the valve plug and/or a wall of the fluid inlet passageway, as long as these members are disposed in the fluid inlet passageway proximate to the orifice between the fluid inlet and the fluid outlet passageways.

Figure 15:
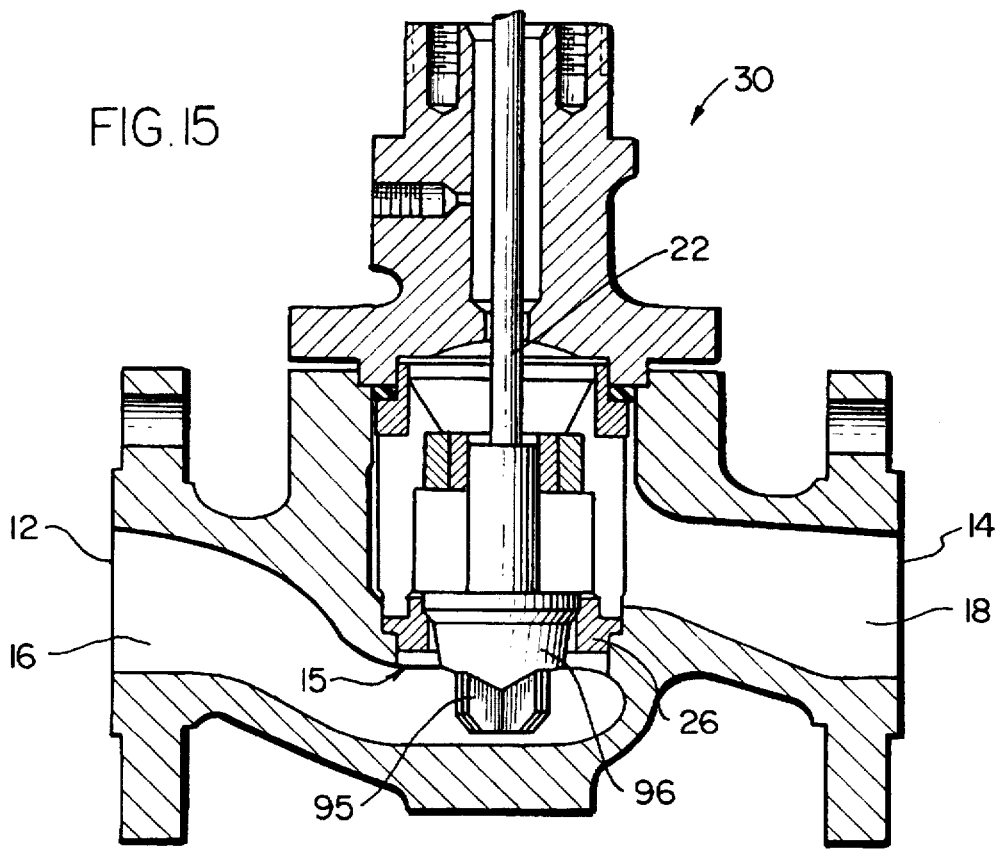
FIG. 15 is a cross-sectional view of a second embodiment of a throttling valve according to the present invention.
Figure 16:
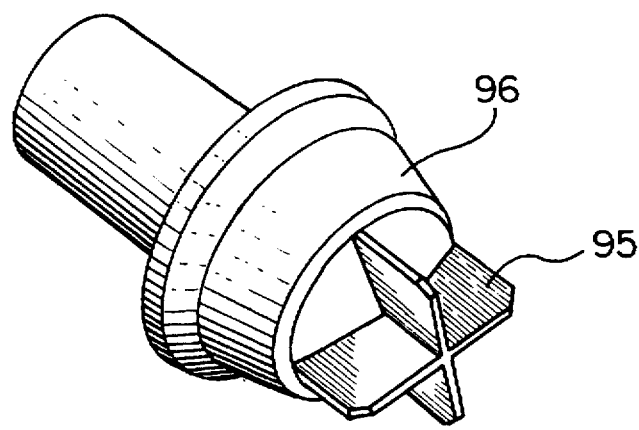
FIG. 16 is a perspective view of the valve plug illustrated in FIG. 15.

Referring now to FIG. 15, a throttling valve 30 having a cross-shaped vane member 95 attached to or formed with a valve plug 96 is illustrated. FIG. 16 illustrates the valve plug 96 and vane 95 in more detail. The vane 95, which can be of any desired size, shape or configuration including any of the vane cylinderical body, basket, etc. configurations described or illustrated above with respect to the seat ring, extends from the bottom of the valve plug 96 so that it is disposed in the inlet fluid passageway 16. As a result, the vane 95 is disposed adjacent the orifice 15 and operates to reduce or eliminate flow disturbances near the orifice 15 which, in turn, stabilizes the flow rate of fluid through the valve 30. In some configurations, mounting a structural component such as the vane 95 on the valve plug 96 may induce flow generated torque on the valve stem 22 which would require adding anti-rotation devices to the valve stem 22.

Figure 17:
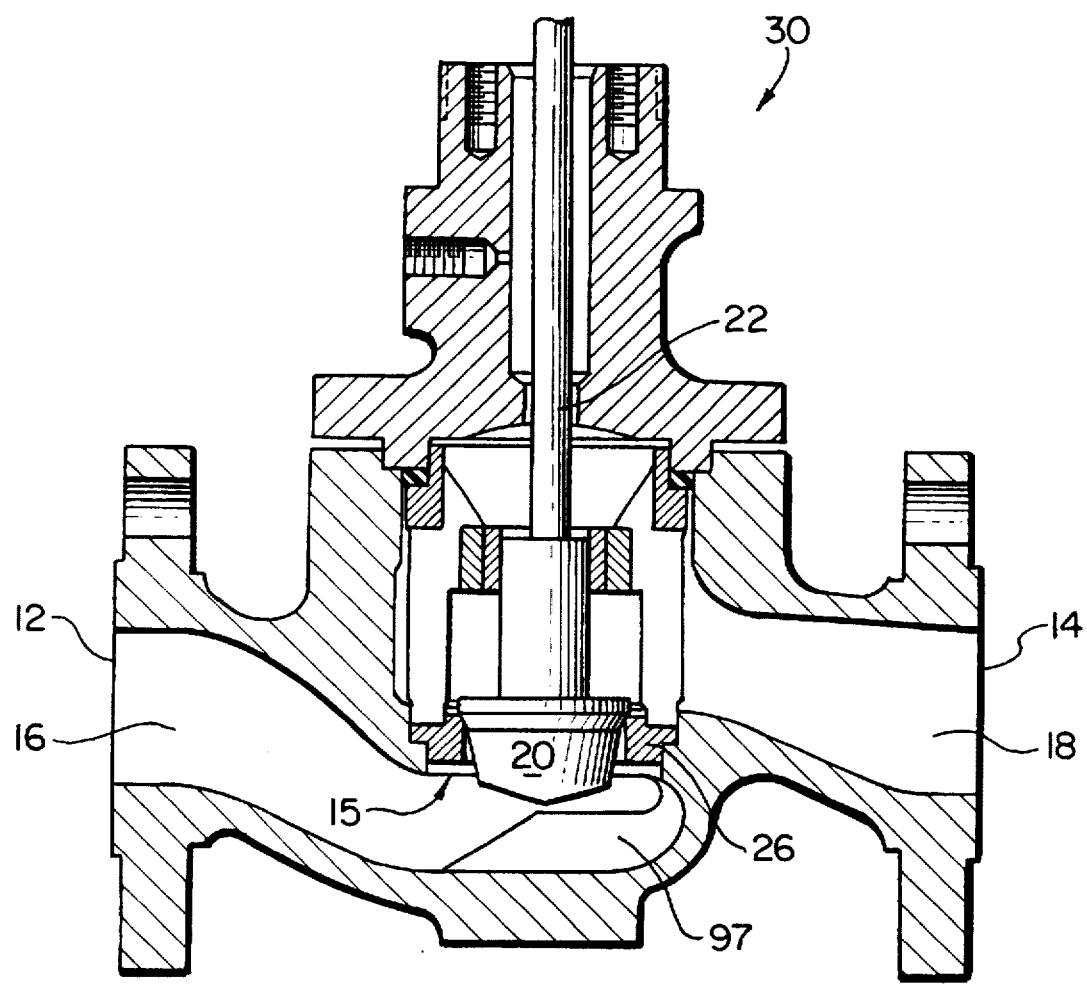
FIG. 17 is a cross-sectional view of a third embodiment of a throttling valve according to the present invention.
Figure 18:
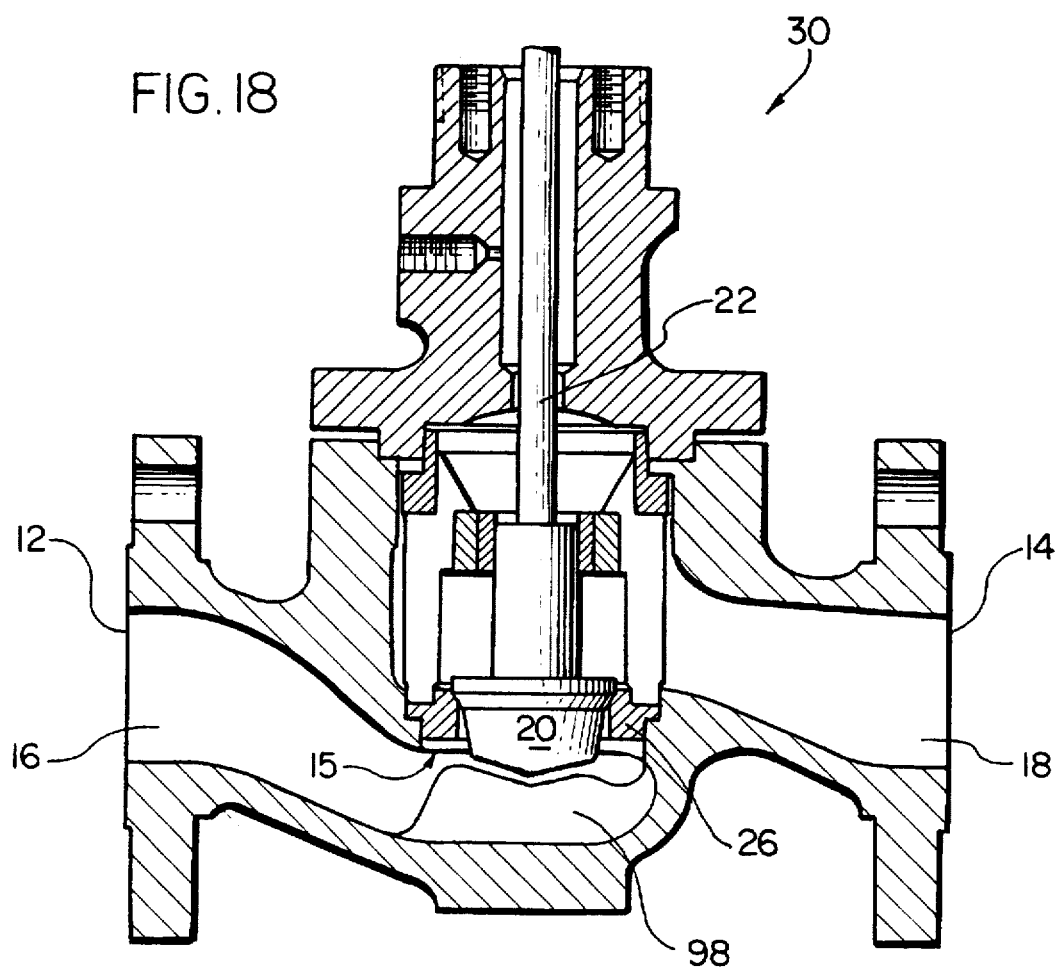
FIG. 18 is a cross-sectional view of a fourth embodiment of a throttling valve according to the present invention.

Referring to FIG. 17, a throttling valve 30 having a vane 97 attached to or formed with walls of the fluid inlet passageway 16 is illustrated. The vane 97, which may be cast along with the valve body of the valve 30 or added after casting of the valve body, is disposed in parallel to the flow of the fluid in the fluid inlet passageway 16 and extends approximately half way across the orifice 15 between the fluid inlet passageway 16 and the outlet fluid passageway 18, after which it tapers off to the bottom of the fluid inlet passageway 16. FIG. 18 illustrates a further vane 98 attached to the walls of the fluid inlet passageway 16 which extends across almost the entire orifice 15 and is contoured to accept the lower surface of the valve plug 20 when the valve plug 20 is in the closed position. The embodiments of FIGS. 17 and 18 have been given for example only, it being understood that any other desired member constructed according to the teachings hereof, including any vanes, cylindrical members, baskets, etc. described or illustrated herein with respect to the seat ring and valve plug embodiments, could be attached to the walls of a fluid inlet passageway or other parts of a valve, instead.

Regardless of whether a disturbance reduction member, comprising a vane, cylindrical body or other body, is connected to the seat ring, the valve plug, a wall of the fluid inlet passageway or other part of a valve, this disturbance reduction member must be disposed adjacent the orifice between the fluid inlet passageway 16 and the fluid outlet passageway 18. Otherwise, the disturbance reduction member will not prevent vortices from occurring between it and the orifice and, therefore, will not operate to prevent fluctuations in the valve flow rate.

For the purpose of this invention, it is considered that any flow disturbance reduction member which is attached to the seat ring or the valve plug of a valve and which extends into the fluid inlet passageway is disposed adjacent the orifice between the fluid inlet and the fluid outlet passageways.

Furthermore, when the fluid disturbance reduction member is attached or coupled to one or more walls of the fluid inlet passageway, this member is considered adjacent the orifice between the fluid inlet and the fluid outlet passageways if it extends around or across a significant portion of that orifice and/or extends into the fluid inlet passageway a significant amount. The further the disturbance reduction member extends into the fluid inlet passageway or around or across the orifice between the fluid inlet and the fluid outlet passageways, the more it tends to reduce vortices or other disturbances in the fluid inlet passageway. For the purposes of this invention, a fluid disturbance reduction member extends significantly into the fluid inlet passageway or around or across a significant portion of the orifice between the fluid inlet and the fluid outlet passageways when this member extends a minimum amount into an imaginary cylinder extending from the orifice between the fluid inlet and the fluid outlet passageways to the bottom of the fluid inlet passageway, such imaginary cylinder being coaxial with the orifice and having a diameter related to the nominal pipe size of the valve. Preferably, the fluid disturbance reduction member extends into or across the imaginary cylinder a minimal amount of at least 50 percent of the distance between the surface of the imaginary cylinder at which the member enters the cylinder and the axial point of the imaginary cylinder closest to the orifice. However, the reduction member may extend into or across the imaginary cylinder a minimal amount of as little as 20 percent of this distance and still operate with some degree of success. Of course any percentage therebetween may be acceptable as well. Furthermore, the diameter of the imaginary cylinder is preferably 1.5 times the nominal pipe size of the valve. However, other multipliers, for example, anywhere between 1.0 and 1.5, could be used as well.

Regardless of the shape or attachment configuration of the disturbance reduction member, this member should not be constructed or configured so that it operates to filter the gas or liquid flowing through the valve. In other words, this member should not accumulate or collect relatively small particles or debris which may be in the fluid flowing through the valve. As a result, a coarse mesh passage, that is, a continuous fluid passage which is large enough to pass relatively small particles or debris which may be within the fluid and which does not, therefore, filter the fluid, should exist between the fluid inlet 12 of the fluid inlet passageway 16 and the orifice 15 of the valve 30. Such a coarse passage exists, for example, between the ring member 40 and the vane 50 of FIG. 2, between the ring member 40 and the vanes 62 and 64 of FIG. 11, through the ends and holes 74 of the cylindrical bodies 72 of FIGS. 12 and 13, through the holes in the coarse mesh screen 94 of FIG. 14 and between the vanes 95, 97 and 98 and the orifice 15 in the seat ring 26 of FIGS. 15, 17 and 18, respectively. If the disturbance reduction member did operate as a filter, this member might restrict the flow of the fluid through valve and would need to be periodically cleaned or replaced. It should be noted, however, that nothing herein would prevent placing a fluid filtering mechanism upstream of the flow disturbance reduction means in any known or desired manner if small particles or debris are not present in the fluid.

Figure 19:
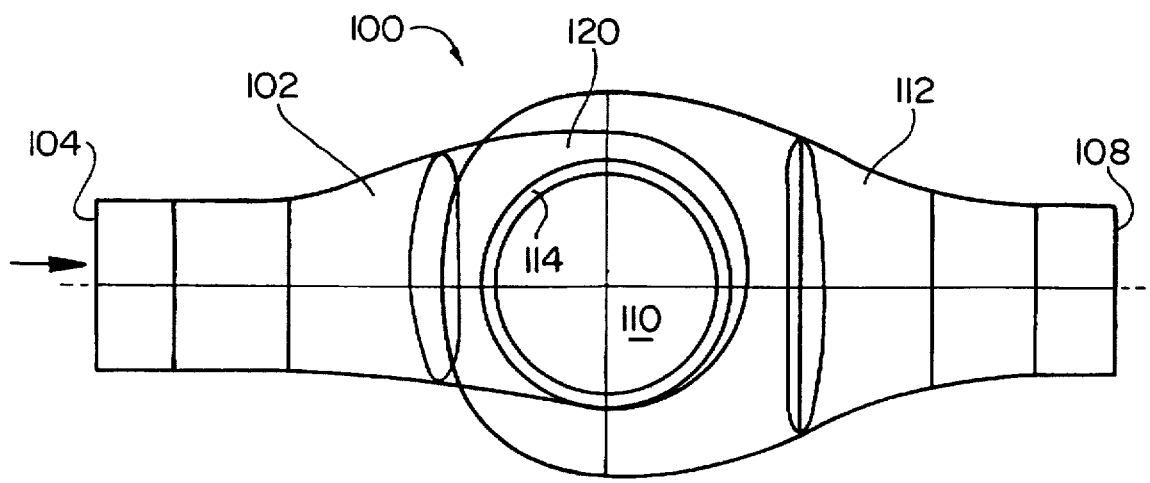
FIG. 19 is a bottom wire-frame diagram view of a fifth embodiment of a throttling valve according to the present invention.

According to another aspect of the present invention, it is desired to actually create a steady-state vortex within the fluid inlet passageway of a throttling valve so as to prevent intermittent vortices from occurring. FIG. 19 illustrates a bottom view of a wire-frame diagram of a throttling valve 100 constructed so as to create a steady-state vortex in a fluid inlet passageway 102. The fluid inlet passageway 102 of the throttling valve 100 couples a fluid inlet 104 to a fluid outlet 108 through an orifice 110 and a fluid outlet passageway 112. A valve plug (not shown) seats against any known seat ring 114 to open and close the valve 100, as is generally known.

The fluid inlet passageway 102 of the throttling valve 100 includes a cavity 120 which creates a vortex within the fluid in the fluid inlet passageway 102. The cavity 120 is formed on an end of the fluid inlet passageway 102 adjacent the orifice 110 and has a center which is not aligned with, that is, is offset from, the center of the seat ring 114. Furthermore, the walls of the cavity 120 are not symmetrically formed with respect to the fluid inlet 104. Because of this configuration, fluid entering the cavity 120 forms into a steady-state vortex. Furthermore, because the vortex created by the cavity 120 is stable, this vortex prevents intermittent vortices or disturbances from occurring and, thereby, provides the throttling valve 100 with a stable fluid flow rate.

Although the cavity 120 has been illustrated in the throttling valve 100 as being smooth and approximately circular in shape, i.e., having an approximately circular cross-section, any other desired cavity or shape could be used as long as this cavity shape creates a steady-state vortex within the fluid in the fluid inlet passageway 102.

The purpose of the members and asymmetrical cavity disposed in the fluid inlet passageway of a valve, as described herein, is to make the flow rate through the valve steady by either preventing vortices or creating steady-state vortices within the fluid inlet passageway. Thus, any member of any desired shape which is disposed within the fluid inlet passageway is considered to be within the coverage of this invention as long as this member operates to prevent swirling flow velocity components of the fluid in the fluid inlet passageway from transferring into the valve plug/seat ring area. Furthermore, any cavity of any desired shape which is formed or disposed in the fluid inlet passageway and/or any other means which creates a steady-state vortex in the fluid in a fluid inlet passageway of a valve is considered to be within the coverage of this invention.

Although the particular vortex preventing and creation devices illustrated herein have been illustrated as being used in flow-up globe and angle type valves, these devices may also be used in any other desired valves including flow-down valves in which the fluid flows downwardly through the valve plug orifice and/or valves which are automatically or manually controlled.

Although the fluid inlet passageway and the fluid outlet passageway have been illustrated herein as being significantly longer than the orifice therebetween, it is considered that the fluid inlet and the fluid outlet passageways could be any desired length and/or that the fluid inlet could be defined as being at any point upstream of the flow disturbance reduction member.

The foregoing detailed description has been given for clearness of understanding only and no unnecessary limitations should be understood therefrom, as modifications will be obvious to those skilled in the art.

We claim:

1. A valve for throttling a fluid comprising:
a fluid inlet passageway having a fluid inlet;
a fluid outlet passageway;
an orifice between the fluid inlet passageway and the fluid outlet passageway;
a seat ring disposed at the orifice;
a moveable valve plug adapted to move towards and away from the orifice to vary the flow of fluid between the fluid inlet passageway and the fluid outlet passageway and to seal the orifice when the valve plug is positioned at the orifice;
a valve plug guiding member located downstream of the orifice that completely guides movement of the valve plug when the valve plug is away from the orifice; and
means coupled to one of the seat ring or the valve plug for reducing swirling flow components of the fluid within the fluid inlet passageway, said means disposed in the fluid inlet passageway adjacent the orifice and having a member disposed over an opening of the orifice to form a coarse passage between the fluid inlet and the orifice.

2. The valve of claim 1, wherein the reducing means is coupled to the seat ring.

3. The valve of claim 2, wherein the seat ring includes an aperture and the reducing means comprises a vane disposed adjacent the aperture.

4. The valve of claim 3, wherein the fluid inlet passageway is adapted to transmit the fluid in a flow direction and the vane is disposed parallel to the flow direction.

5. The valve of claim 3, wherein the fluid inlet passageway is adapted to transmit the fluid in a flow direction and the vane is disposed perpendicular to the flow direction.

6. The valve of claim 3, wherein the fluid inlet passageway is adapted to transmit the fluid in a flow direction and the vane is disposed diagonal to the flow direction.

7. The valve of claim 3, wherein the reducing means includes a further vane disposed adjacent the aperture.

8. The valve of claim 7, wherein the vane and the further vane are disposed perpendicular to one another.

9. The valve of claim 1, wherein the reducing means includes a cylindrical body having a wall.

10. The valve of claim 9, wherein the wall of the cylindrical body has an opening therein which allows fluid to flow therethrough.

11. The valve of claim 1, wherein the reducing means comprises a basket coupled to the seat ring.

12. The valve of claim 1, wherein the reducing means comprises means for blocking vortices within the fluid in the fluid inlet passageway.

13. The valve of claim 1, wherein the reducing means is connected to the valve plug.

14. The valve of claim 13, wherein the reducing means comprises a vane.

15. A valve for throttling a fluid comprising:
a fluid inlet passageway having a fluid inlet;
a fluid outlet passageway;
an orifice between the fluid inlet passageway and the fluid outlet passageway;
a moveable valve plug adapted to move with respect to the orifice to vary the flow of fluid between the fluid inlet passageway and the fluid outlet passageway;
a seat ring having an aperture disposed at the orifice; and
a vane coupled to the seat ring and disposed in the fluid inlet passageway adjacent the aperture to reduce flow rate disturbances in the fluid within the fluid inlet passageway, said vane including two leg portions coupled to the seat ring and a bluff body connecting member connected between the two leg portions.

16. The valve of claim 15, wherein the connecting member is disposed adjacent the center of the aperture.

17. A seat ring for use in a valve having a moveable valve plug disposed to move towards and away from an orifice located between a fluid inlet passageway and a fluid outlet passageway, the seat ring comprising:
a ring member having an aperture therein adapted to receive the valve plug; and
a flow altering member connected to the ring member having a bluff body adapted to be disposed in the fluid inlet passageway for reducing swirling flow components of the fluid within the fluid inlet passageway.

18. The seat ring of claim 17, wherein the flow altering member comprises a vane.

19. The seat ring of claim 18, wherein the flow altering member includes a further vane.

20. The seat ring of claim 19, wherein the vane and the further vane are disposed perpendicularly to one another.

21. The seat ring of claim 17, wherein the flow altering member includes a cylindrical body.

22. The seat ring of claim 21, wherein the cylinderical body has a wall and openings at the longitudinal ends thereof and wherein the cylindrical body is connected to the ring member such that the longitudinal axis of the cylindrical body is parallel to the longitudinal axis of the ring member.

23. The seat ring of claim 17, wherein the flow altering member comprises a basket.

24. The seat ring of claim 17, wherein the flow altering member includes a coarse passage therethrough.

25. A seat ring for use in a valve having a moveable valve plug disposed between a fluid inlet passageway and a fluid outlet passageway, the seat ring comprising:
a ring member having an aperture therein adapted to receive the valve plug; and
a vane connected to the ring member and having a substantially flat surface adapted to be disposed in the fluid inlet passageway to reduce disturbances within the fluid in the fluid inlet passageway, said vane connected to radially opposite portions of the ring member.

26. A seat ring for use in a valve having a moveable valve plug disposed between a fluid inlet passageway and a fluid outlet passageway, the seat ring comprising:
a ring member having an aperture therein adapted to receive the valve plug; and
a vane connected to the ring member and adapted to be disposed in the fluid inlet passageway to reduce disturbances within the fluid in the fluid inlet passageway, said vane comprising two leg portions connected to the ring member and a bluff body portion connected between the two leg portions.

27. A method of reducing intermittent vortices within a valve having a fluid inlet passageway with a fluid inlet, a fluid outlet passageway and a valve plug that is moveable with respect to an orifice between the fluid inlet passageway and the fluid outlet passageway, the method comprising the steps of:
using a valve plug guiding member located downstream of the orifice to completely guide movement of the valve plug when the valve plug is away from the orifice;

providing a fluid to the fluid inlet passageway; and connecting a structural member in the fluid inlet passageway to a closure member, that effects closure of the orifice, at a point adjacent the orifice so that the structural member is over a portion of the orifice, forms a coarse passage between the fluid inlet and the orifice and prevents intermittent vortices within the fluid in the fluid inlet passageway.

28. The method of claim 27, wherein the step of disposing includes the step of placing the structural member in the fluid inlet passageway to block the flow path of swirling components of the fluid within the fluid inlet passageway with respect to an axis normal to the orifice.

29. The method of claim 28, further including the step of disposing a seat ring at the orifice and wherein the step of placing includes the step of attaching the structural member to the seat ring.

30. The method of claim 28, wherein the step of placing includes the step of attaching the structural member to the valve plug.

31. The method of claim 27, further comprising the step of placing a bluff body on the structural member to contact and prevent the intermittent vortices within the fluid in the fluid inlet passageway.

32. A valve for throttling a fluid comprising:

a fluid inlet passageway having a fluid inlet;

a fluid outlet passageway;

a member having a valve seat disposed between the fluid inlet passageway and the fluid outlet passageway;

a moveable valve plug adapted to move with respect to the valve seat to vary the flow of fluid between the fluid inlet passageway and the fluid outlet passageway; and means for reducing swirling flow components of the fluid within the fluid inlet passageway, said means coupled to one of the valve plug and the member and including a bluff body disposed in the fluid inlet passageway.

33. The valve of claim 32, wherein the reducing means is connected to the member.

34. The valve of claim 33, wherein the reducing means comprises a vane member.

35. The valve of claim 32, wherein the reducing means is connected to the valve plug.

36. The valve of claim 35, wherein the reducing means comprises a vane member.

37. A valve comprising:

a fluid inlet passageway having a fluid inlet;

a fluid outlet passageway;

an orifice between the fluid inlet passageway and the fluid outlet passageway;

a structural member disposed at the orifice for effecting closure of the orifice;

a guide member disposed downstream of the orifice to completely guide movement with respect to the structural member to effect closure of the orifice; and means disposed over the orifice in the fluid inlet passageway for reducing swirling flow components of a fluid within the fluid inlet passageway, wherein the reducing means is connected to the structural member to form a coarse passage between the fluid inlet and the fluid outlet passageway.

38. The valve of claim 37, wherein the structural member comprises a valve seat.

39. The valve of claim 38, wherein the reducing means comprises a vane.

40. The valve of claim 39, wherein the vane comprises multiple vane members.

41. The valve of claim 37, wherein the reducing means comprises means for blocking the swirling flow components flowing around an axis normal to the orifice.

42. The valve of claim 37, wherein the structural member comprises a valve plug.

43. The valve of claim 42, wherein the reducing means comprises a vane.

44. The valve of claim 37, wherein the structural member includes a bluff body disposed in the fluid inlet passageway.

* * * * *